United States Patent [19]

d'Agostino et al.

[11] Patent Number: 4,526,343
[45] Date of Patent: Jul. 2, 1985

[54] DEVICE FOR THE DISTRIBUTION OF A FLUID

[75] Inventors: Guy d'Agostino, Vitry; André Dhainaut, Dammarie les Lys; Jacques A. A. Petiteau, Le Chatelet en Brie, all of France

[73] Assignee: Society Nationale d'Etude et de Construction de Moteurs d'Aviation, "S.N.E.C.M.A.", France

[21] Appl. No.: 665,078

[22] Filed: Oct. 26, 1984

Related U.S. Application Data

[62] Division of Ser. No. 434,169, Oct. 13, 1982, abandoned.

[30] Foreign Application Priority Data

Oct. 19, 1981 [FR] France ............................... 81 19573

[51] Int. Cl.$^3$ ............................................. F16K 27/04
[52] U.S. Cl. .............................. 251/367; 137/625.67; 137/625.25
[58] Field of Search .................... 137/625.25, 625.67, 137/625.69; 251/366, 367; 29/157.1 R

[56] References Cited

U.S. PATENT DOCUMENTS

| 827,170 | 7/1906 | Murphy . | |
|---|---|---|---|
| 2,220,479 | 11/1940 | De Bell | 137/625.23 X |
| 2,807,280 | 9/1957 | Kittredge | 137/599.1 |
| 2,975,806 | 3/1961 | Moen | 251/367 X |
| 3,188,724 | 6/1965 | Bates et al. | 251/366 X |
| 3,189,049 | 6/1965 | Carlson | 251/367 X |
| 3,584,651 | 6/1971 | Paschke | 251/367 X |
| 3,598,152 | 8/1971 | Andrews | 251/367 X |
| 3,665,961 | 5/1972 | Bachmann | 137/884 |
| 3,957,079 | 5/1976 | Whiteman | 137/884 X |
| 3,976,103 | 8/1976 | Ostic | 137/625.69 |
| 3,989,113 | 11/1976 | Spring, Sr. et al. | 137/625.69 X |
| 4,066,099 | 1/1978 | Wittren | 251/367 X |
| 4,168,724 | 9/1979 | Graffunder et al. | 137/884 X |
| 4,308,892 | 1/1982 | Van Ausdal | 137/625.24 X |
| 4,449,426 | 5/1984 | Younger | 137/884 X |

FOREIGN PATENT DOCUMENTS

| 178098 | 2/1962 | Fed. Rep. of Germany . | |
|---|---|---|---|
| 2046980 | 3/1972 | Fed. Rep. of Germany . | |
| 74 19146 | 7/1973 | France . | |
| 2238102 | 6/1974 | France . | |
| 178098 | 2/1962 | Sweden | 251/367 |
| 545534 | 6/1942 | United Kingdom . | |

Primary Examiner—A. Michael Chambers
Assistant Examiner—John C. Fox
Attorney, Agent, or Firm—Bacon & Thomas

[57] ABSTRACT

The invention concerns a fluid distribution device of the type comprising on the one hand, a metallic body with a borehole, in the thickness of which a plurality of channels for the circulation of the fluid is provided, and on the other hand, in the bore of the body a core mobile in rotation or in translation capable of establishing communication between said channels, when the core occupies at least two predetermined positions. The body of the device is constituted by the tight and inseparable joining of at least two elements joined together by contact surfaces of an exactly complementary configuration and at least certain of the channels of the body consisting at least in part of grooves cut into at least one of the contact surfaces.

3 Claims, 10 Drawing Figures

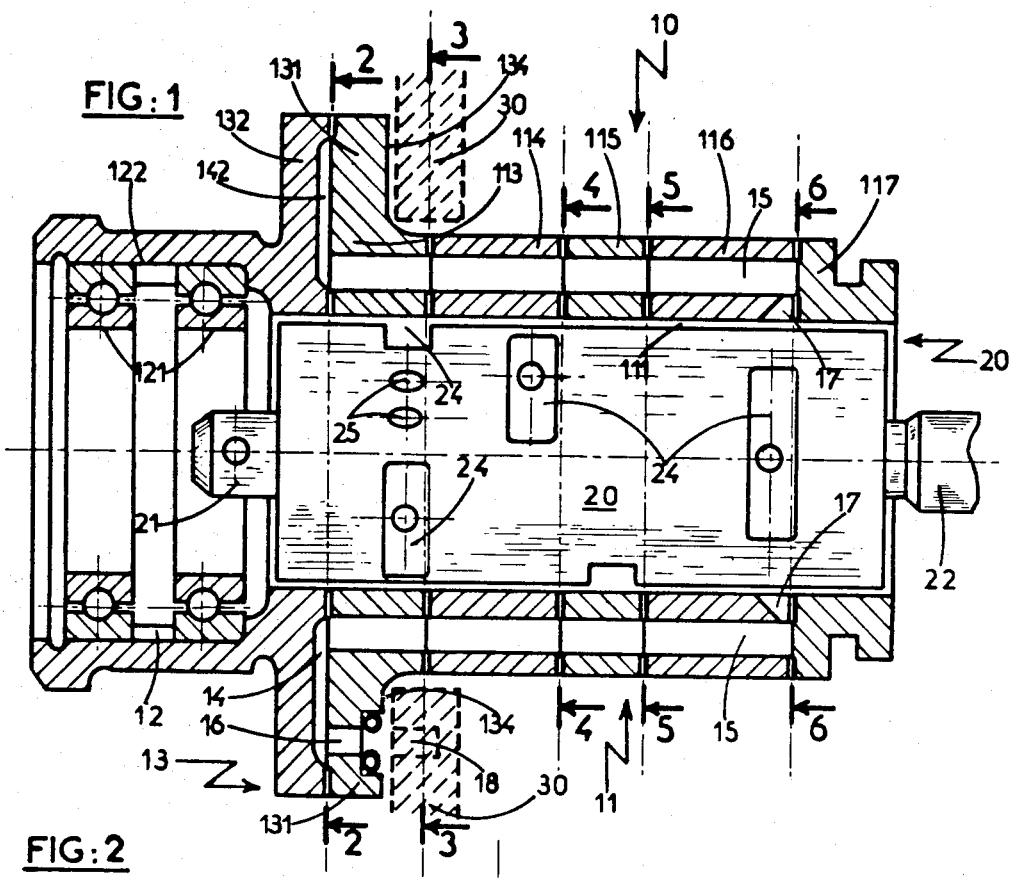
FIG: 1
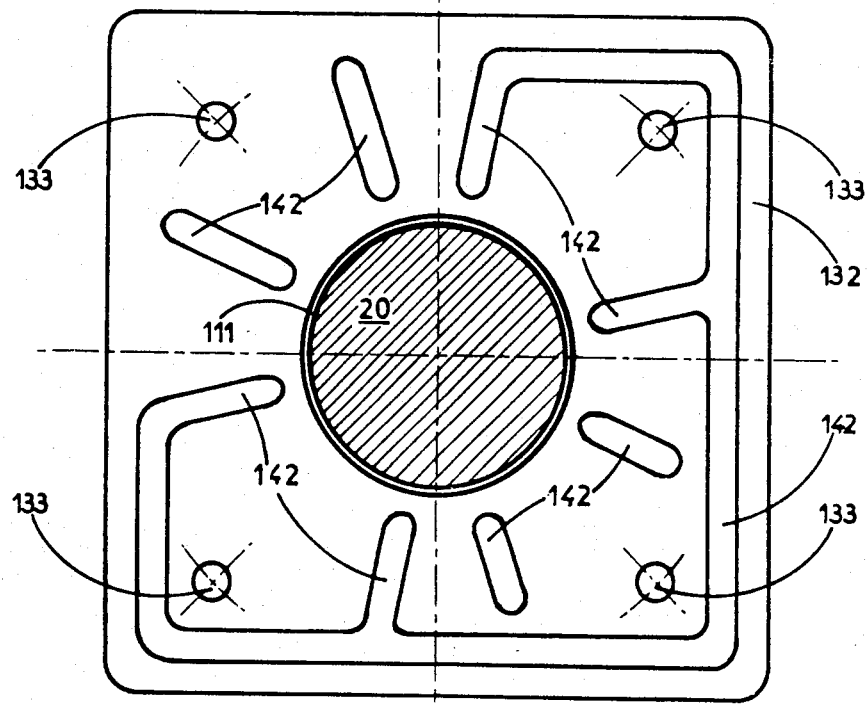
FIG: 2

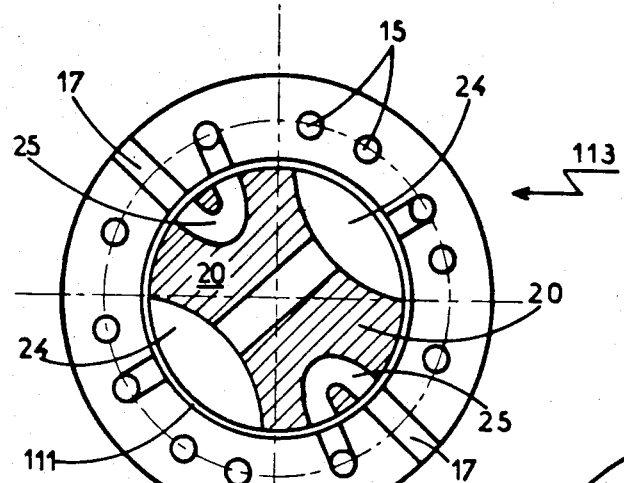
FIG: 3
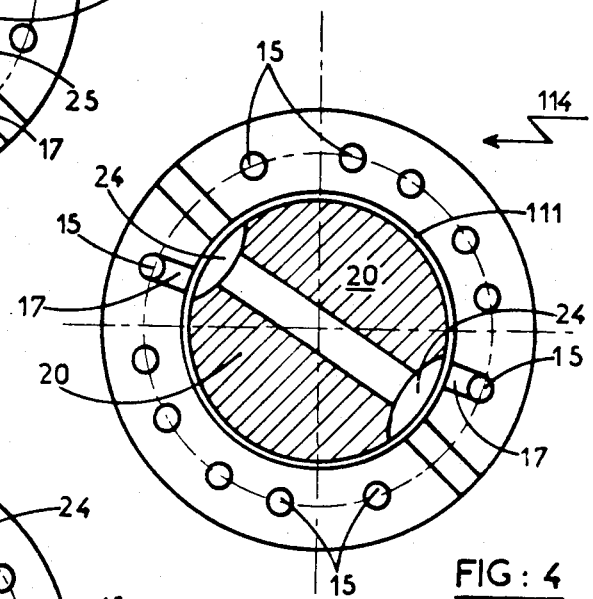
FIG: 4
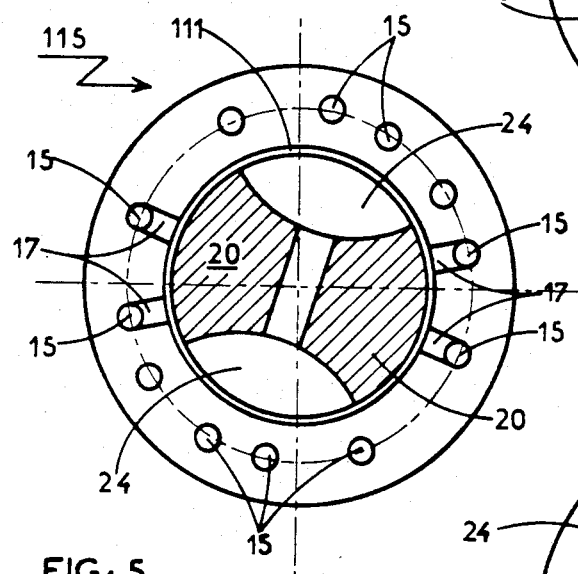
FIG: 5
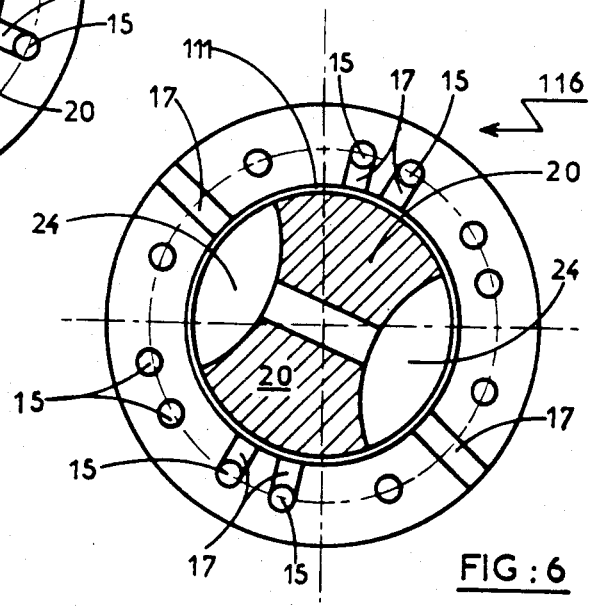
FIG: 6

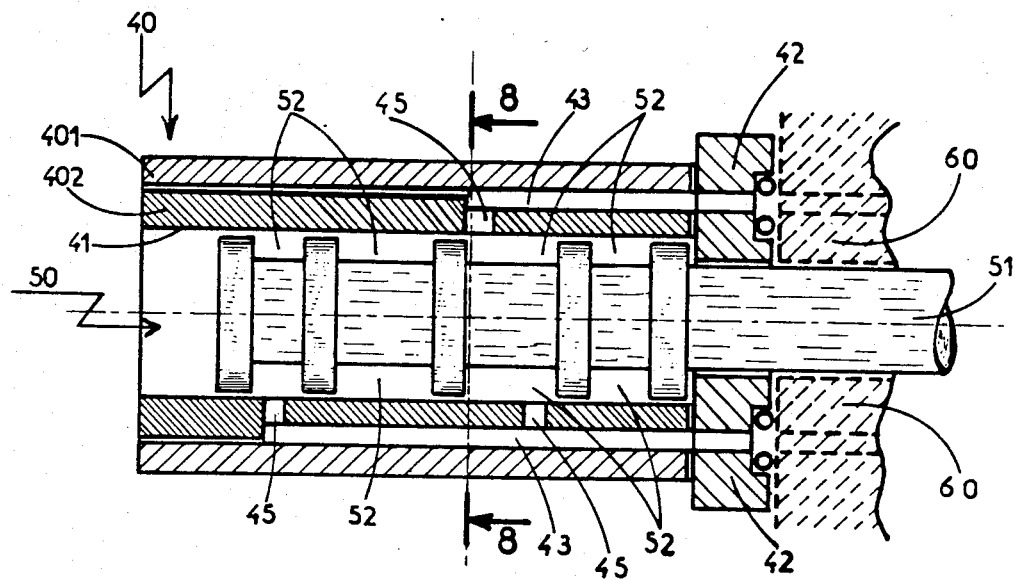
FIG: 7
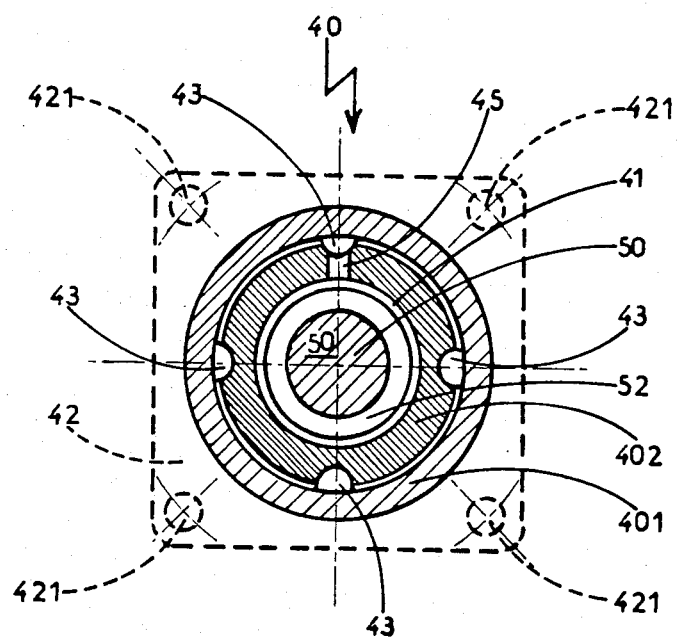
FIG: 8

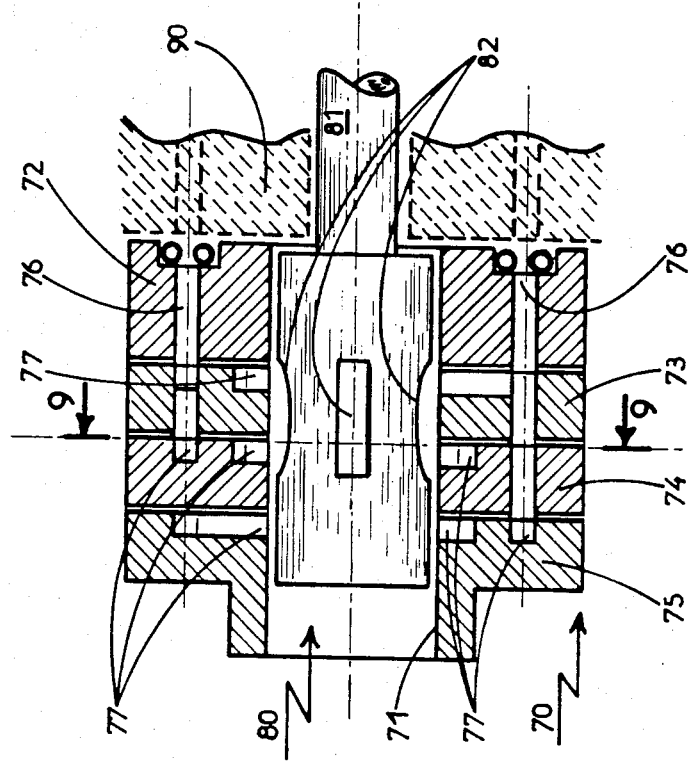
FIG: 9
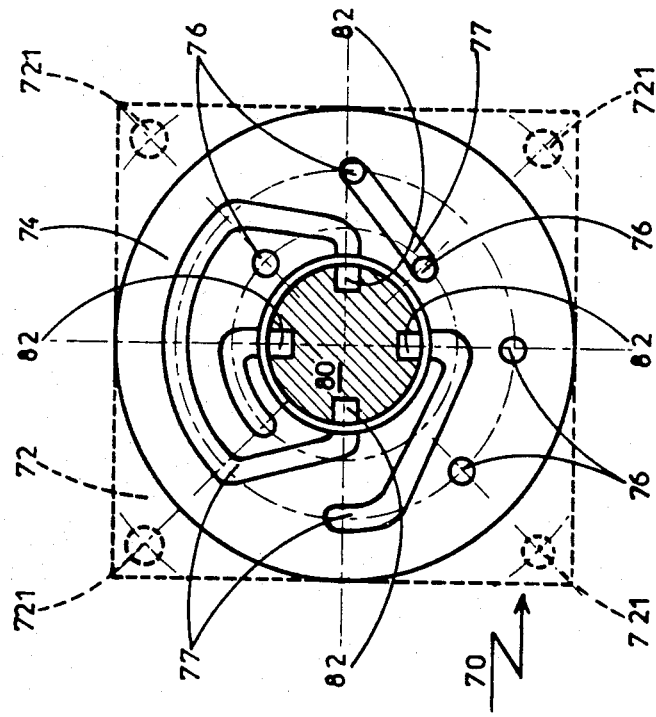
FIG: 10

DEVICE FOR THE DISTRIBUTION OF A FLUID

This application is a division of application Ser. No. 434,169, filed Oct. 13, 1982, now abandoned.

BACKGROUND OF THE INVENTION

The invention concerns devices to distribute a fluid, of the type comprising:

a metal body traversed by a prismatic or cylindrical, calibrated bore and into the thickness of which a plurality of fluid circulation channels is cut, each of which places the outside of the body in communication with its bore, a movable core in said bore, designed to establish different communications between at least certain of the channels of the body, when said core occupies at least two predetermined positions.

This definition includes:

distribution devices (faucets, gate valves or distributors) with a core movable either in rotation (cocks) or in translation (slide valves), both devices for the distribution of liquids and devices for the distribution of gas, both devices providing progressive variations of the flow rate of the fluid and devices rapidly providing variations of the all or nothing type (commutation).

It applies further without regard to the number of fluid distribution circuits (fluid inlet and outlet) and to the number of channels of the body, but its application becomes more advantageous with increasing numbers of circuits and channels.

In effect, the known devices for the distribution of fluids of the above-mentioned type have disadvantages which become more appreciable with rising numbers of circuits to be served. For example, in order to make possible the machining of the orifices of the circuits opening into the bore of the body, it is frequently necessary to produce the body in two parts, namely a drilled casing into which transverse channels opening laterally to the outside of the casing are machined, and on the other hand, a bored lining inserted into the bore of the casing, into the circumference of which a plurality of annular grooves is machined, said grooves being in communication with the channels and opening into the bore of the lining through the said orifices. To prevent leakage between the grooves belonging to different circuits, the grooves must be spaced apart and separated by toric seals. The distribution device under consideration is thus excessive in length (due to the piping connected with the transverse channels). Therefore, the greater the number of circuits, the more complex and expensive is the configuration, the more space is required and the higher the risk of leakage, and the more the installation in and removal from the casing of the lining becomes difficult and delicate, and the more numerous the occasions on which the toric seals are damaged.

SUMMARY OF THE INVENTION

A first object of the invention is provide a fluid distribution device of the above-mentioned type free of the disadvantages described hereinabove. A second object is the process to provide such a device.

The fluid distribution device is characterized in that in order to produce said body in a single piece into which all of the necessary channels are machined:

said body consists of the tight and irreversible assembly of at least two metal elements joined to each other by contact surfaces which are exactly complementary, at least some of the channels machined in a body consists at least in part of grooves cut into at least one of the contact surfaces.

The tight and irreversible assembly of the elements of the body may be effected for example by adhesive bonding or by brazing. In order to avoid the risk of failure due to the interposition of a material melting more readily than that or those of the elements, and of obstructing the channels during the assembly process, it is preferable whenever possible, to effect the assembly by metallic diffusion under pressure and at elevated temperatures (diffusion welding).

The joining surfaces may be flat and normal to the axis of the bore of the body. The channels thus comprise, in addition to the grooves cut into the flat surfaces, rectangular boreholes parallel to said axis. It is also possible to use a combination of assemblies of flat and cylindrical surfaces. It will be seen that these dispositions make it possible to obtain in a very simple fashion highly complex networks of channels.

The process of the invention is essentially characterized in that it includes the following operations:

the preparation of at least two metal elements having contact surfaces that are exactly complementary and designed so that their juxtaposition constitutes the body, cutting into at least one of the contact surfaces at least one groove intended to constitute at least partially, at least one of the channels of the body, the tight and irreversible assembly of said elements, by advantageously using diffusion welding.

Prior to the assembly, the elements may be equipped, if necessary, with centering and adjusting means, which may be required to obtain their appropriate relative positioning.

BRIEF DESCRIPTION OF THE DRAWINGS

Further novel and advantageous dispositions will become apparent from the descriptions hereinafter of embodiments of fluid distribution devices according to the invention. The descriptions refer to the drawings attached hereto, wherein:

FIG. 1 is an axial section of a hydraulic distributor with a cock, according to the invention;

FIGS. 2, 3, 4, 5 and 6, respectively, are sections of this distributor in the section planes 2—2, 3—3, 4—4, 5—5 and 6—6 of FIG. 1;

FIG. 7 is an axial section of a slide valve hydraulic distributor according to the invention, in keeping with a first embodiment;

FIG. 8 is a cross section of this slide valve distributor in the section plane 8—8 of FIG. 7;

FIG. 9 is an axial cross section of another hydraulic slide valve distributor according to the invention, in keeping with a second embodiment; and FIG. 10 is a cross section of this slide valve distributor in the section plane 9—9 of FIG. 9.

DESCRIPTION OF THE PREFERRED EMBODIMENTS

In a general manner, in the aforementioned figures:

the clearances between the bodies and the cores (cocks or slides) are greatly exaggerated, the sections of the permanent joining surfaces (for example, by diffusion welding) are represented by heavy lines, only the dispositions are described and represented, the description of which is necessary for an understanding of the invention.

Specifically, the functions of the different circuits obtained by the displacement of the cores in the bodies are not described, as the invention concerns the configuration of the distributors and not said functions.

FIGS. 1, 2, 3, 4, 5 and 6 are considered simultaneously. The hydraulic cock distributor which they show has three circuits (high, median and low pressure). It is intended for the control of an emergency feed regulator of turbojet engines. It comprises, in a known manner, a body 10 and a cock 20 mounted rotatably in the body. The latter consists of a cylindrical casing 11 joined to a coupling seat 12 by means of a flange 13. The cylindrical cock 20 is housed in a bore 111 which extends the length of the casing 11 and opens into a bore hole 122 of a larger diameter provided in the seat 12.

The end of the cock 20 facing the bore 122 has an axial projection 21 and the other end has an axial projection 22. A coupling, not shown and supported by bearings 121 located in the seat 12, makes it possible to control the rotation of the cock 20 by means of the projection 21. The bearings 121 cooperate further with a set-collar (not shown) joined to the projection 22 to prevent axial translation of the cock.

Portions of channels 14 provided in the thickness of the flange 13 communicate with portions of channels 15 machined into the thickness of the casing 11 to form a network of channels which opens into the bore 111 through orifices, such as 17, and which connect the orifices with the inlet or outlet lines of the fluid, such as 18. Recesses 24 or channels 25 which are machined into the cock 20 by milling or drilling, connect at least two orifices 17 in each operating position. It is unnecessary to describe the functions of the different fluid circuits which may be established in this manner for an understanding of the invention.

The different configurations which characterize the invention of hydraulic distributor mentioned hereinabove, will now be considered.

The body 10 consists of an assembly of cylindrical elements joined to each other by flat joining surfaces which coincide, respectively, with the section planes 2—2, 3—3, . . . 6—6 of FIG. 1. In other words, FIG. 2, which is a section passing through the flange 13, shows the portion 132 of the flange which forms with the seat 12 one of these elements and FIG. 3 shows the element 113, which carries the portion 131 of the flange; FIGS. 4, 5 and 6 show, respectively, the elements 114, 115 and 116, but not the element 117. These elements are joined together by a process (for example, diffusion welding), which yields tight and inseparable joints. Most or all of the channels 14 communicate with external feed or fluid distribution circuits by means of the orifices 16 provided through the portion 131 of the flange; the orifices 16 relate to the conduits 18 provided in the wall of the housing 30. A gasket ensures tightness. The orifices pass through a housing wall 30 used to support and immobilize the distributor by means of bolts (not shown), which pass through the passage holes 133 (FIG. 2). The channels 14 consist of grooves 142 provided in the flange 132. The orifices 16 thus open through the support surface 134 of the part 131 of the flange.

The different phases of the production of the body 10 are the following:

the machining of the elements 12, 131, 114, 115, 116, 117 (the bores and the peripheries are merely roughed in to allow for finishing following the assembly), drilling the channels 15, machining of the groove 142 forming the channels 14, drilling the orifices 16, assembly of the different elements, for example, by diffusion welding (the necessary centering and adjusting marks are not shown), and, finishing the bores and the peripheries.

The invention thus makes it possible, by means of extremely simple machining operations, to produce compact, reliable distributors, having multiple channels capable of performing highly complex functions.

The cock 20 may be produced by the machining of a monolithic blank or by machining and assembling cylindrical elements joined subsequently at their flat faces. The recesses 24 and the channels 25 may, in the second case, be produced by the hollowing of certain of the flat faces.

FIGS. 7 and 8 relate to a slide distributor (i.e. with a sliding core) according to the invention. A four-way distributor is involved. The cylindrical slide 50, with two operating positions, slides in the bore 41 of the body 40. It is actuated by a rod 51. The body 40 is secured by a flange 42 to a wall of the housing 60 by means of fastening bolts passing through the holes 421 drilled into said flange. The latter is indicated by a broken line in FIG. 8, because it is in front of the plane of the cross section. Longitudinal inlet or outlet channels 43 are machined into the thickness of the body 40. They open on the one hand through the mounting face of the flange 42 to be connected with the conduits and on the other hand, into the bore 41 by means of the radial orifices 45. Communication between certain of these orifices as a function of the two operating positions of the slide 50 is assured by the circular grooves 52.

According to the invention, the body 40 consists of three elements assembled in a tight and inseparable manner, namely:

the flange 42 itself, a cylindrical outer sleeve 401 fastened to the flange 42, and, a cylindrical inner sleeve 402 inserted in the sleeve 401 and also fastened to the flange 42.

The longitudinal channels 43 are grooves of different length machined into the outer wall of the inner sleeve 402. The latter is traversed by the orifices 45.

The process of the production of the body 40 includes the following principal phases:

the machining to general dimensions of the sleeve 401, the sleeve 402 and the flange 42, milling the grooves 43 angularly distributed over the circumference of the sleeve 402 and drilling the orifices 45 in the thickness of the latter, inserting the sleeve 402 into the sleeve 401, joining the two sleeves, for example, by diffusion welding, forming the end faces of the two sleeves to be coplanar, joining the two sleeves with the flange 42, for example, by diffusion welding, trueing the bore 41, and, trueing the supporting face of the flange 42.

In principle, if the two sleeves are fitted with sufficient precision, simple shrink fitting may be sufficient to obtain their tight joining. This shrink fitting may be effected in the conventional manner by cooling the sleeve 402 and introducing it into the preheated sleeve 401. It is, however, preferable following the introduction of the sleeve 402, to effect diffusion welding proper by applying to the outside of the sleeve 401 and the inside of the sleeve 402 a certain isostatic pressure at a temperature such that interdiffusion takes place. In this manner, all risks of a leakage between the two sleeves are prevented, even if abrupt variations in the operating temperature occur.

FIGS. 9 and 10 illustrate another embodiment of the four-way slide distributor according to the invention, in which the flat joining surfaces for the tight and inseparable joining of the different elements constituting the body are all flat. The cylindrical slide 80, with two operating positions, slides in the bore 71 of the body 70. It is actuated by means of a rod 81. The body 70 is secured by means of its square flange 72 to a wall 90 of the housing by bolts, not shown, which pass through the flange through the holes 721. The rectilinear, longitudinal blind channels 76 for the inlet and outlet of the fluid, machined into the body 70, communicate on the one hand, with the piping, and on the other hand with the channels 77 arranged in three diametrical planes and opening into the bore 71. Longitudinal notches 82 with a circular bottom 82 are milled into the slide 80 and make it possible for the channels 77 of the intermediate plane to communicate with the channels 77 of one or the other of the other diametrical planes.

According to the invention, the body 70 consists of a pile of four plates, i.e., in succession, a square plate constituting the flange 72 and three cylindrical plates 73, 74 and 75. The plane of the section 9—9 of FIG. 9 coincides with the joining plane of the plates 73 and 74 and FIG. 10, consequently, shows the plate 74. The flange 72, in front of the plane of the cross section, is indicated by a broken line.

The process of producing the body 70 is the same as the process to produce the body 10 of FIGS. 1 and 2. All of the channels are machined prior to the welding of the plates 72, 73, 74 and 75. As the channels 76 are obtained by shallow drilling and the channels 77 by cutting on the flat surfaces, the operation presents no difficulties.

To complete the present description, the advantages of the invention are recapitulated hereinafter. They make it possible:

to readily produce fluid distributors performing highly complex functions, to reduce the number of removable pieces (single piece body, reduction of the number of toric seals which are required only for the joints of the piping or conduits with the channels), to increase without difficulty the number of orifices of the channels in the bore of the body, because they may be produced with small diameters and with high precision, to increase the density of the circuits (number of circuits and thus of functions per unit length of the body), and, in a general manner, to reduce the longitudinal and lateral dimensions of the body.

Concerning the latter point, it should be noted that in all of the embodiments described, the orifices connecting the channels with the piping always open in the supporting face used to secure the distributor. However, it is further possible to pass any electric circuits that may be required to actuate or control the operation, through this face. The invention does not concern the mode of controlling the core, which may be actuated by manual, electric, hydraulic or pneumatic means.

In the embodiments described, the surfaces for the tight and irreversible joining of the elements of the body are flat surfaces transverse to the axis of the body or cylindrical surfaces centered on said axis. But, there is no reason why flat joining surfaces parallel to said axis could not be provided.

The invention thus allows a high degree of freedom in the design of fluid distribution devices, the moreso since it makes it possible to connect these devices to fluid circuits of a conventional design (piping) or with circuits consisting, for example, of flat planes joined together in a tight and inseparable manner, into which grooves are cut, to replace the piping.

1. A fluid distribution device comprising:
(a) a generally cylindrical outer sleeve;
(b) a generally cylindrical inner sleeve concentrically attached to the outer sleeve, the inner sleeve having an outer surface which defines a plurality of generally longitudinal grooves extending various lengths from one end of the inner sleeve so as to define, with the outer sleeve, at least fluid inlet and outlet passages, and an opening extending through the wall of the inner sleeve at the end of each groove so as to open into the interior of the inner sleeve;
(c) a mounting flange attached to the one end of the inner and outer sleeves, the flange defining a plurality of passages therethrough, each passage being aligned with a groove of the inner sleeve so as to communicate therewith;
(d) a valve spool slidably retained in the inner sleeve, the valve spool having a plurality of radially extending lands thereon; and,
(e) means to move the valve spool along the longitudinal axis of the inner sleeve to at least two positions to control the fluid communication between the openings extending through the wall of the inner sleeve.

2. The fluid distribution device according to claim 1 wherein the inner sleeve is diffusion bonded to the outer sleeve.

3. The fluid distribution device according to claim 2 wherein the flange is diffusion bonded to the inner and outer sleeves.

* * * * *